United States Patent [19]

Scott et al.

[11] 3,867,955

[45] Feb. 25, 1975

[54] AIR AND/OR VAPOUR SEPARATION DEVICE

[75] Inventors: Ian John Scott, West Pennant Hills, New South Wales; Froie Edwin Tessier, North Rocks, New South Wales, both of Australia

[73] Assignee: Gilbarco Aust. Ltd., North Ryde, New South Wales, Australia

[22] Filed: Nov. 7, 1972

[21] Appl. No.: 304,450

[30] Foreign Application Priority Data
  Nov. 17, 1971  Australia............................. 7072/71
  May 10, 1972  Australia............................. 8912/72

[52] U.S. Cl...................... 137/179, 55/166, 55/169, 73/200, 137/192, 137/202
[51] Int. Cl.............................................. B01d 19/00
[58] Field of Search............. 55/160, 165, 166, 167, 55/168, 169, 170; 73/200; 137/202, 203, 204, 413, 486, 179, 192; 251/24, 43

[56] References Cited
UNITED STATES PATENTS

| | | | |
|---|---|---|---|
| 318,899 | 5/1885 | Haydn.................................. | 251/43 |
| 2,049,239 | 7/1936 | Wilcox............................... | 222/72 X |
| 2,217,655 | 10/1940 | Bassett................................ | 137/202 |
| 2,330,703 | 9/1943 | Grise.............................. | 73/200 UX |
| 2,693,196 | 11/1954 | Hundley......................... | 73/200 UX |

FOREIGN PATENTS OR APPLICATIONS 1,121,895   1/1962   Germany........................... 137/413

Primary Examiner—Alan Cohan
Assistant Examiner—Gerald A. Michalsky
Attorney, Agent, or Firm—Ladas, Parry, Von Gehr, Goldsmith & Deschamps

[57]         ABSTRACT

A device for purging liquid of gas that may be present in a liquid flow line. There is included a valve means situated in a main flow line and a gas detection means which initiates the closing of the valve means when foul liquid is detected. Subsequently after the explusion of the fouling gases from the liquid, the detection means initiates the reopening of the valve means thereby allowing only clean liquid to pass through to the liquid discharge.

1 Claim, 6 Drawing Figures

AIR AND/OR VAPOUR SEPARATION DEVICE

This invention relates to a gas separation device and in particular to a device for the separation and expulsion of gas which may be entrained in a liquid flow line.

It is particularly disadvantageous in most applications which require the accurate metering of a volume of liquid through a pipe or tube for the liquid which is being metered to be contaminated in any way with gas, which term includes air and/or vapour and other gases. The disadvantage lies in the fact that highly inaccurate readings may result when a liquid to be metered is aerated to any extent. Such inaccurate readings result from the fact that most metering devices register substantially the same volume reading for aerated liquid passing through a pipe or tube as for air and/or vapour free liquid passing through the same pipe or tube. The actual volume of gas free liquid passing a given point in the latter case is greater, assuming the flow rate in both cases is constant.

The present invention overcomes the above-mentioned disadvantage by separating out and expelling air and/or vapour and other gases from liquid flow lines so that accurate metering of the liquid may take place.

The device of the present invention may be located at any point in a liquid flow line, but preferably upstream from and in relatively close proximity to a metering device.

Alternatively, the device of the present invention may be located at any point in a liquid flow line which does not include a metering device which line may be required simply to support a continuous uninterrupted flow of liquid downstream from the present device.

The device for separating gas that may be present in a liquid flow line comprises a valve means situated in the main flow line and a gas detection means which initiates the closing of the valve means when fouled liquid is detected and subsequently, after the expulsion of the fouling gases from the liquid, the detection means initiate the reopening of the valve means, such that only clean liquid is allowed to pass through the main flow line discharge.

The interrelationship of the above-mentioned integers will now be more fully indicated by a description of the operation of several particular embodiments of the invention.

FIG. 1 illustrates one form of the preferred embodiment of the present invention.

Figure 6:
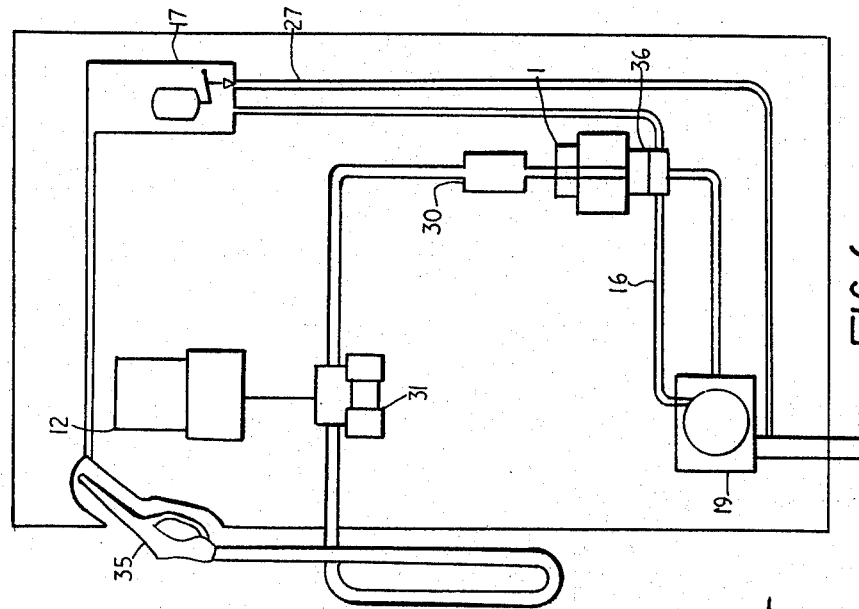
FIG. 6 is an elevation view of a self contained liquid dispenser unit incorporating the invention as described in the preferred embodiment of FIG. 3.

The separation tank 1 is of standard design and contains a vent valve 2 operated by a float 3. The vent valve being situated in the head chamber 4 of the separation tank 1. A control valve 5 which is operated by another float 6, controls the operation of the main valve 7 which effectively allows the fluid to flow into the separation tank.

Any common pump unit or an air separator pump unit may be used to pump the liquid from a source along a flow line 9.

Under normal operating conditions the air and/or vapour separator tank 1 is full of liquid and only the head chamber 4 contains a volume of air. Liquid is pumped from a source along the main flow line 9 through the main valve 7 and into one end of the separation tank. As the liquid passes from the pipe 9 into the separation tank 1 its velocity is greatly reduced. Such reduction in velocity allows any entrained air or vapour to rise to the liquid surface in the tank. The liquid then passes through a separator filter 10 in the tank which also assists in separating out entrained air or vapour and the liquid thence flows to the opposite end of the tank and out through a discharge pipe 11 located in the bottom surface of the tank.

When the volume of air and/or vapour collected in the tank is sufficient to cause the liquid level to drop the float 6 connected to operate a control valve 5 also falls causing the control valve to close which in turn closes the main valve 7 thus restricting or preventing liquid flow into the tank. At about the same time as the control valve 5 is caused to close due to the drop in liquid level another float 3 connected to operate the vent valve 2 also falls due to the drop in liquid level causing the vent valve to open permitting exhaust of the air and/or vapour from the separation tank to the atmosphere.

When the main valve 7 is closed, a by-pass opening 12 in the piston 13 permits a small flow of liquid into the separation tank causing the liquid level to rise as the air and/or vapour is allowed to exhaust. As the liquid reaches a predetermined level the vent valve 2 is caused to close and the pilot valve 5 is also caused to open, in turn causing the main valve to open. When the pilot valve is open, liquid is allowed to flow into the air separation tank through both the main valve and through the pilot valve via the passage and orifice 8 within the main valve. The system is now returned to normal flow conditions.

If a large "slug" or volume of air and/or vapour trapped in the flow line 9 enters the separation tank, the liquid level drops rapidly. This causes the float 6 connected to operate the pilot valve 5 to fall so closing the pilot valve which in turn closes the main valve and at substantially the same time causes the float 3 connected to operate the vent valve 2 to fall so opening the vent valve. The volume of air and/or vapour in the tank is then exhausted through the vent valve. If a portion of the "slug" of air and/or vapour continues to pass through the flow line when the main valve closes, this air and/or vapour passes through the by-pass and into the separation tank. The air and/or vapour so entering the tank is exhausted directly through the vent valve 2 which is maintained in the open position until liquid again begins entering the chamber through the by-pass so causing the liquid level to rise to a predetermined level at which the vent valve closes, and the control valve opens. The opening of the control valve causes the main valve to open, allowing normal flow into the separation chamber and normal operation of the system.

A real advantage is obtained by providing the main valve at the separator inlet. By doing so, the high volume of flow normally supplied by the submerged pump is reduced to a small volume in the presence of excessive air which provides an opportunity for the air within the chamber to separate and collect at the top and then be vented to the atmosphere. The positive main valve operating structure of the system insures that full flow is reduced to by-pass flow in the presence of excess gases and that full flow is once again resumed after expulsion of this excess air.

The previously mentioned by-pass may take two forms, the first form (not shown) comprises a passage or pipe taken off the delivery line upstream of the main valve, which pipe enters the separation tank. As previously mentioned, when the main valve is closed, liquid passes through the by-pass line and into the tank to restore the liquid level.

The other form of the by-pass is defined by a small cut-out section in the main valve piston 13 such that when the main valve is caused to close on its seat a small orifice exists between the piston and the seat to allow a small volume of liquid to pass continually into the tank until the liquid level in the tank is restored.

Figure 2:
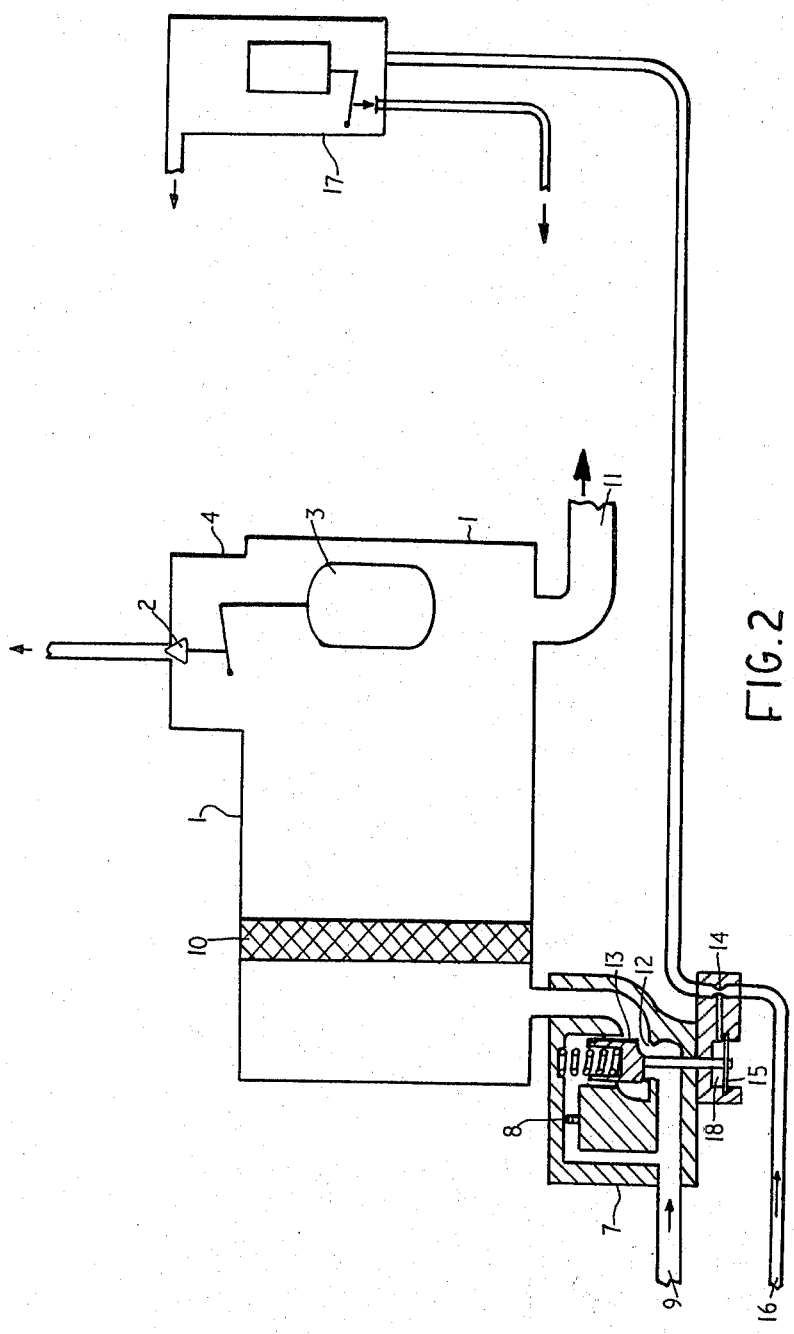
FIG. 2 is a schematic diagram illustrating another embodiment of the present invention.

FIG. 2 illustrates another form of the preferred embodiment. The separation tank 1 is of similar design to the earlier embodiment, in this arrangement, however, only the vent valve 2 is present. The main valve 7 in this instance is directly operated by a venturi 14 controlled diaphragm 15.

Under normal operating conditions the separation tank is again full of liquid wherein only the head chamber contains a volume of compressed air and/or vapour. Again a pump or preferably, an air separation pump, pumps liquid from a source along a flow line 9 through the main valve 7 and into one end of the separation tank. An air separator pump assembly 19 (see FIG. 3) is preferable and may be of a standard design. These pumps are useful in separating some of the entrained air and/or vapour, however their efficiency alone is not adequate to supply distillate which is completely free of the gases, as may be obtained when this unit is combined with the present invention. The air separating unit 19 consists basically of a pump 20, a separation chamber 21 and a filter 22 to assist in separating out entrained gases. The working interrelationship of above integers will be more fully discussed later when referring to FIG. 3. A small amount of liquid is tapped from the main supply and passes via a pilot line 16 through the venturi 14 and on to the air separator sump unit 17 wherein it is recycled back to the suction end of the pump or air separator pump. The venturi produces a partial vacuum in the diaphragm chamber 18 and on reaching a specified minimum, directly causes the main valve 7 to open. Liquid then, flows through the main valve and is directed upwards into one end of the air separator tank. The larger cross-section area of the separation tank reduces the liquid flow velocity and the liquid flows through the filter 10, which assists to separate out entrained air, and then out through the bottom outlet 11 in the tank at the other end.

Introduction of air into the venturi causes a destruction of the vacuum, thus causing the main valve to directly close. A by-pass inlet 12 in the closed main valve 7 allows for a slow fluid flow of between 2 to 3 gallons per minute. As air is collected in the tank it will cause the liquid level to drop until the downward movement of the float will open the vent valve 2 permitting air and/or vapour exhaustion into the atmosphere. The by-pass 12 then permits a small flow of fluid into the separation tank allowing the air to expel and the liquid level to rise until the raised level will close the vent valve again. A return to normal operation is again achieved when all the air is separated from the liquid and "clean" liquid is passing through the venturi system, allowing the main valve again to open.

Should the venturi or the main valve by-pass become blocked or the diaphragm fail, the system will automatically close the main valve, indicating a fault in the system. Failure of the system due to the presence of air or a mechanical fault will still allow operation of the system but at a reduced flow rate. This system then is also useful in early detection of any malfunction of the apparatus thus allowing for speedy repairs.

Figure 3:
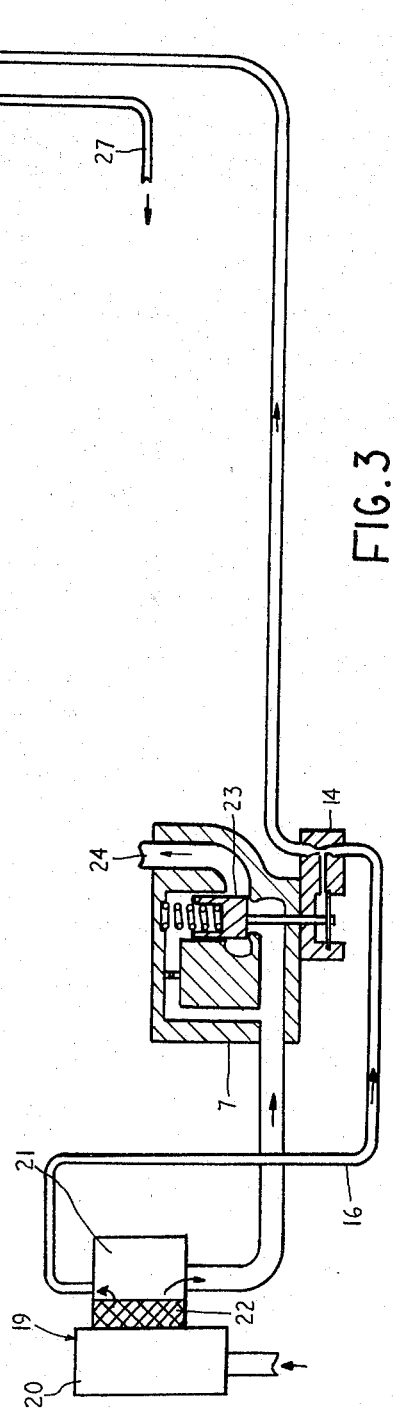
FIG. 3 is also a schematic diagram illustrating yet another alternative form of the invention.

FIG. 3 illustrates yet another embodiment of the present invention. This arrangement basically consists only of an air separator pump unit 19 and a main valve 7 which is directly operated by a venturi controlled diaphragm. The piston 23 of the main valve unit 7 is a modified piston in that it does not allow for a by-pass. When the main valve is closed no liquid is allowed to flow through the discharge outlet 24.

Under normal operating conditions, liquid from a source is passed through the air separator filter 22 of an air separator pump unit 19 into the air separation chamber 21. When no air is present the liquid then finally passes through to the discharge outlet 24. When air is present in the system, the air will rise to the top of the separating chamber 21 and flow through the pilot line 16 connected to the venturi 14. As before, the introduction of air into the venturi causes the destruction of the vacuum thus causing the main valve 7 to completely close off the flow of liquid. The pilot line 16 is directed to a sump unit 17 which contains a float 25, and a valve 26 capable of closing off the return line 27 from the sump when the liquid level within the sump is at a predetermined level. If the level of liquid is below the limit preset, the valve 26 remains closed and air and/or vapour are allowed to escape to the atmosphere. When the liquid level is higher than the predetermined level, the float 25 will cause the valve 26 to open and the accumulated liquid is allowed to recycle back to the suction end of the pump section 20.

When the separation chamber 21 of the air separation pump has been purged of all air and/or vapour the flow of liquid through the pilot line 16 again creates a vacuum at the venturi and the main valve is again caused to open, hence recreating normal flow.

Figure 1:
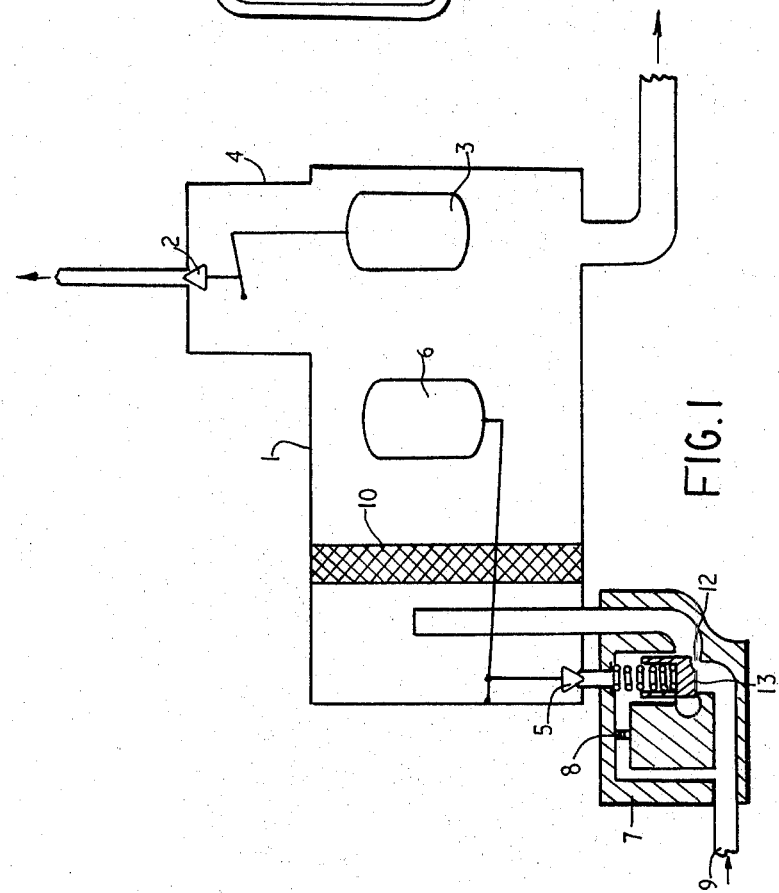
FIG. 1 is a schematic diagram illustrating one form of the embodiment of the present invention.
Figure 4:
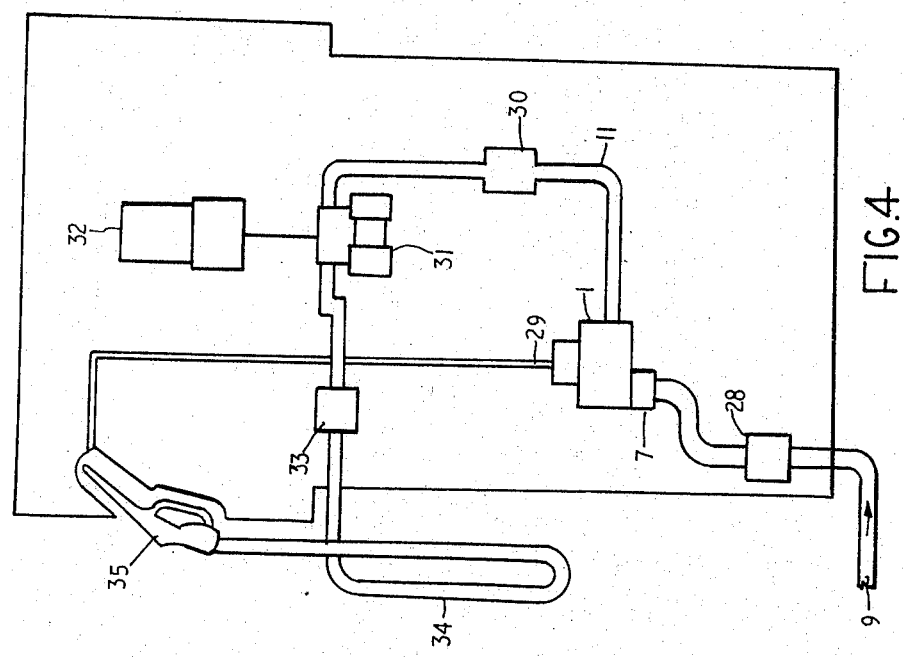
FIG. 4 is an elevation view of a remote liquid dispenser unit incorporating the invention as described in the preferred embodiment of FIG. 1.

FIG. 4 illustrates one form of a remote liquid dispenser unit incorporating the invention as described in the preferred embodiment of FIG. 1. The liquid from a source is pumped through a strainer 28 by any common pump via the flow line 9. The liquid then passes through the main valve assembly 7 and into the separation tank 1. As described hereinbefore, if the vent valve is open, air and/or vapour is allowed to escape to the atmosphere via vent line 29, whilst liquid would be restrained from flowing because the main valve would be closed. When the air separation tank was purged of air the main valve would open, simultaneously closing the vent valve, and liquid would be allowed to flow through the pressure regulating valve 30 and through a calibrated flow meter 31 interconnected to a computer 32 which would interpret the volume of liquid dispensed and when required, its cost.

The flow of liquid could be initiated by a solenoid valve 33, which may open when a lever at the nozzle 35 was depressed. For obvious reasons a flexible hose 34 may be connected between the nozzle and the solenoid.

Figure 5:
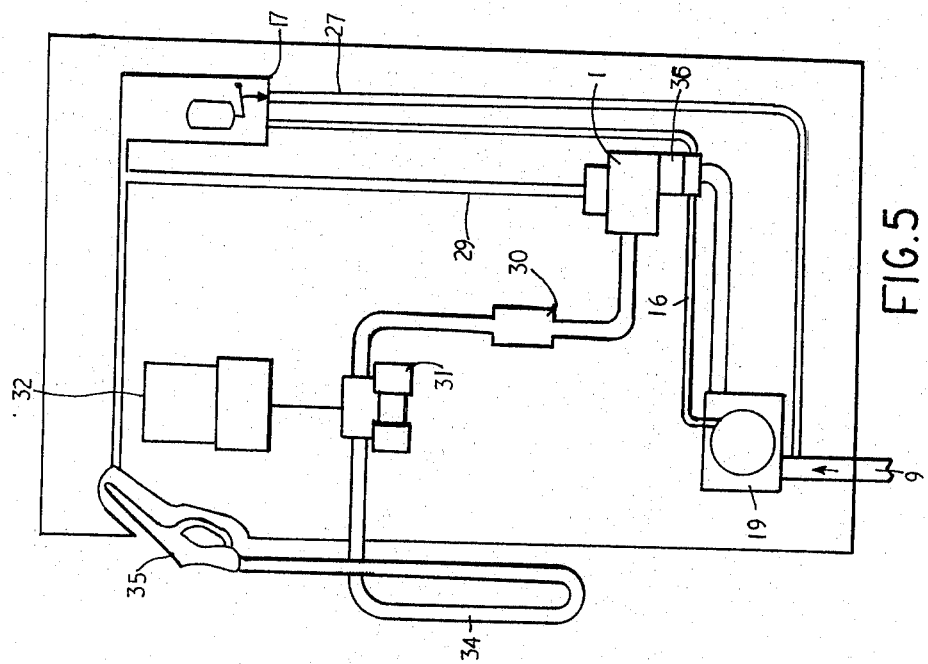
FIG. 5 is an elevation view of a self contained liquid dispenser unit incorporating the invention as described in the preferred embodiment of FIG. 2.

FIG. 5 illustrates a similar form of liquid dispenser unit incorporating the invention as described in the preferred embodiment of FIG. 2.

This arrangement is similar to one described in FIG. 4, only that a venturi and valve assembly 36 is utilized. The air and/or vapour separation still occurring predominately in a separation tank, which exhausts the gases to the atmosphere via line 29 when the vent valve opens. As also described hereinbefore this arrangement incorporates an air separator sump 17 which allows for recycling the liquid via line 27 to the suction end of the pump.

FIG. 6 illustrates a further possible form of liquid dispenser unit incorporating the invention as described in the preferred embodiment of FIG. 3. This arrangement is a further simplification of FIG. 5 wherein the air separation tank 1 has been completely eliminated from the unit.

It is to be understood that the embodiments described herein are merely illustrative of the principles of the invention. Various modifications thereto may be effected by a person skilled in the art without departing from the spirit and scope of the invention.

What we claim is:

1. A device for purging fouling gas or vapour from a main liquid flow line comprising a main valve located in said flow line said valve including a pressure sensitive valve actuating means; a pilot flow line with an inlet in communication with a gas detection point upstream in the main line flow and a discharge end, said pilot line further including a venturi located between said inlet and discharge; and a further communication between said venturi and said pressure sensitive valve actuating means; whereby presence of air or vapour increases the pressure in the said further communication causing said valve actuating means to close off said main valve and subsequently discharge the air or vapour via said pilot line such that when no air or gas remains in said further communication the reduced pressure therein allows said valve actuating means to re-open said main valve to permit purged liquid therethrough, and wherein the discharge from the said pilot line is to a gas separation means including a vent to atmosphere and a float operated liquid discharge for recycling through said purging device.

* * * * *